(12) United States Patent
Standish et al.

(10) Patent No.: US 7,883,324 B2
(45) Date of Patent: Feb. 8, 2011

(54) WIND TURBINE AIRFOIL FAMILY

(75) Inventors: Kevin Standish, Simpsonville, SC (US);
Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1066 days.

(21) Appl. No.: 11/621,272

(22) Filed: Jan. 9, 2007

(65) Prior Publication Data

US 2008/0166235 A1 Jul. 10, 2008

(51) Int. Cl.
*F03D 1/02* (2006.01)
(52) U.S. Cl. ............... 416/242; 416/223 R; 416/243; 416/DIG. 2; 416/DIG. 5
(58) Field of Classification Search ............ 416/223 A, 416/223 R, 242, 243, DIG. 2, DIG. 5; 415/4.1, 415/4.3, 4.5; 290/44, 55
See application file for complete search history.

(56) References Cited

U.S. PATENT DOCUMENTS

| | | | |
|---|---|---|---|
| 1,473,066 A * | 11/1923 | Wells | ................ 416/235 |
| 4,552,511 A * | 11/1985 | Sumigawa | ................ 416/242 |
| 5,292,230 A | 3/1994 | Brown | |
| 6,068,446 A * | 5/2000 | Tangler et al. | .......... 416/223 R |
| 6,503,058 B1 | 1/2003 | Selig et al. | |
| 2005/0232778 A1* | 10/2005 | Kakishita et al. | ........ 416/223 R |

FOREIGN PATENT DOCUMENTS

EP     1152148 B1     4/2001

OTHER PUBLICATIONS

Author: C.P. Van Dam, et al; Title: "Innovative Structural and Aerodynamic Design Approaches for large Wind Turbine Blades"; Journal: American Institute of Aeronautics and Astronautics, pp. 1-12.
Author: K. J. Standish, et al.; Title: "Aerodynamic Analysis of Blunt Trailing Edge Airfoils"; Journal: Journal of Solar Energy engineering; Dated: Nov. 2003, vol. 125; pp. 479-487.

* cited by examiner

*Primary Examiner*—Christopher Verdier
*Assistant Examiner*—Aaron R Eastman
(74) *Attorney, Agent, or Firm*—Sutherland Asbill & Brennan LLP

(57) ABSTRACT

A family of airfoils for a wind turbine blade. Each airfoil may include a blunt trailing edge, a substantially oval shaped suction side, and a substantially S-shaped pressure side.

20 Claims, 1 Drawing Sheet

WIND TURBINE AIRFOIL FAMILY

TECHNICAL FIELD

The present application relates generally to wind turbines and more particularly relates to a family of airfoil configurations for an inboard region of a wind turbine blade.

BACKGROUND OF THE INVENTION

Conventional wind turbines generally include two or more turbine blades or vanes connected to a central hub. Each blade extends from the hub at a root of the blade and continues to a tip. A cross-section of the blade is defined as an airfoil. The shape of an airfoil may be defined in relationship to a chord line. The chord line is a measure or line connecting the leading edge of the airfoil with the trailing edge of the airfoil. The shape may be defined in the form of X and Y coordinates from the chord line. The X and Y coordinates generally are dimensionless. Likewise, the thickness of an airfoil refers to the distance between the upper surface and the lower surface of the airfoil and is expressed as a fraction of the chord length.

The inboard region, i.e., the area closest to the hub, generally requires the use of relatively thick foils ($30\% \leq t/c \leq 40\%$). The aerodynamic performance of conventional airfoil designs, however, degrades rapidly for thicknesses greater than 30% of chord largely due to flow separation concerns. For thicknesses above 40% of chord, massive flow separation may be unavoidable such that the region of the blade may be aerodynamically compromised.

Thus, there is a need for an airfoil design that provides improved aerodynamic performance particularly with respect to the inboard region. Preferably, such a design would provide improved aerodynamic performance and efficiency while providing improved structural stiffness and integrity.

SUMMARY OF THE INVENTION

The present application thus provides a family of airfoils for a wind turbine blade. Each airfoil may include a blunt trailing edge, a substantially oval shaped suction edge, and a substantially S-shaped pressure side.

The airfoils may include a chord line extending from a leading edge to the blunt trailing edge. The substantially oval shaped suction sides and the substantially S-shaped pressure sides do not intersect the chord line. The suction sides may include non-dimensional coordinate values of X and positive Y set forth in Tables 1-4. The pressure sides may include non-dimensional coordinate values of X and negative Y set forth in Tables 1-4. Each of airfoils is connected by a smooth curve.

Each airfoil may include a first width about the blunt trailing edge, a second width moving towards a leading edge, with the second width being smaller than the first width, and a third width moving further towards the leading edge, with the third width being larger than the first width. Each airfoil may include a curved leading edge.

A first airfoil may include a profile substantially in accordance with non-dimensional coordinate values of X and Y set forth in Table 1. A second airfoil may include a profile substantially in accordance with non-dimensional coordinate values of X and Y set forth in Table 2. A third airfoil may include a profile substantially in accordance with non-dimensional coordinate values of X and Y set forth in Table 3. A fourth airfoil may include a profile substantially in accordance with non-dimensional coordinate values of X and Y set forth in Table 4. Each airfoil may be an inboard region airfoil.

The present application further describes a turbine blade having a number of airfoils. The airfoils may include a first airfoil with a profile substantially in accordance with non-dimensional coordinate values of X and Y set forth in Table 1, a second airfoil with a profile substantially in accordance with non-dimensional coordinate values of X and Y set forth in Table 2, a third airfoil with a profile substantially in accordance with non-dimensional coordinate values of X and Y set forth in Table 3, and a fourth airfoil with a profile substantially in accordance with non-dimensional coordinate values of X and Y set forth in Table 4. The airfoils are connected by a smooth curve.

The X and Y values may be scalable as a function of the same constant or number to provide a scaled up or scaled down airfoil. The airfoils may include a number of inboard region airfoils. The turbine blade may be a wind turbine blade.

These and other features of the present application will become apparent to one of ordinary skill in the art upon review of the following detailed description when taken in conjunction with the several drawing and the appended claims.

DETAILED DESCRIPTION

Figure 1:
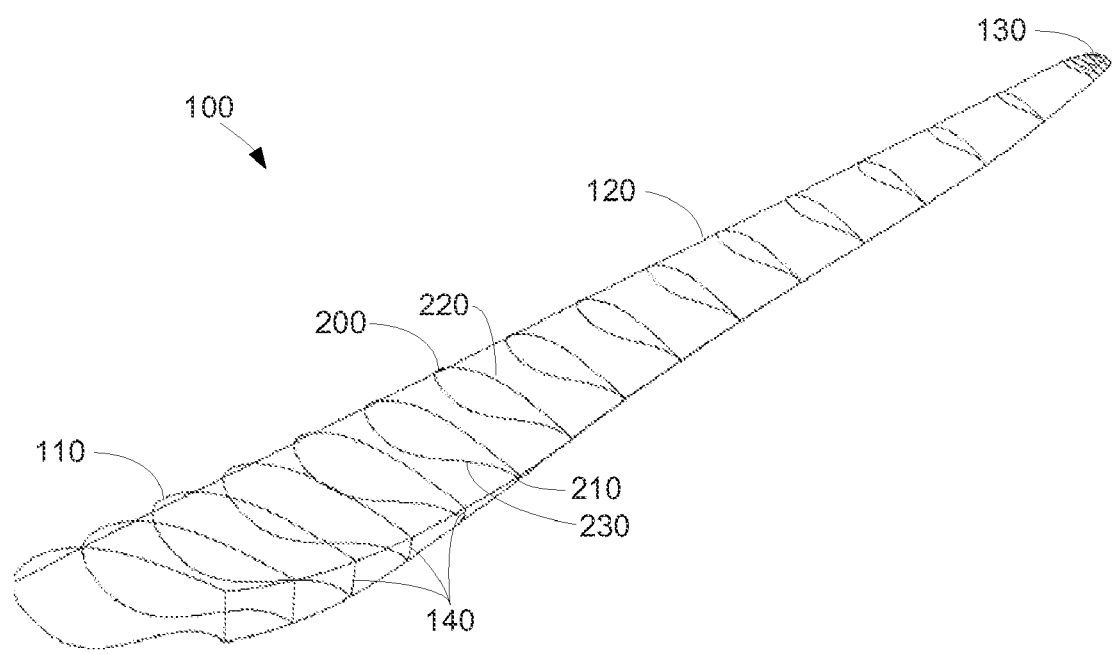
FIG. 1 is a perspective view of a blade as is described herein with a number of airfoils shown.

Referring now to the drawings, in which like numerals refer to like elements throughout the several views, FIG. 1 shows a blade 100 as is described herein. The blade 100 includes the inboard region 110 adjacent to the hub (not shown), an outboard region 120 or the middle portion, and a tip region 130. The inboard region 110 generally takes up about the first half of the blade 100 or so, the outboard region generally takes up about the next forty percent (40%) or so, and the tip 130 takes up about the final ten percent (10%) or so of the blade 100. The figures may vary.

Figure 2:
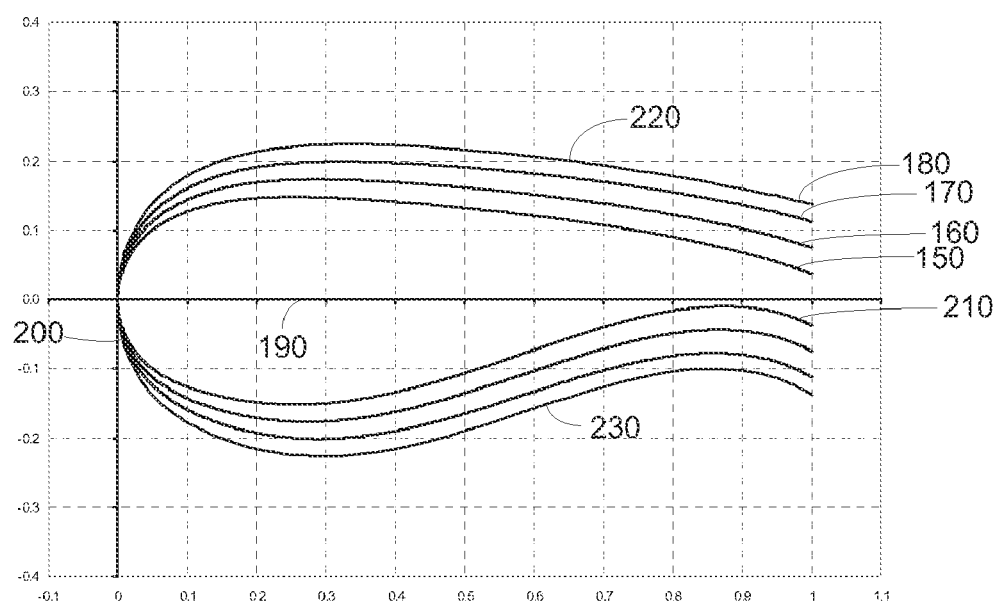
FIG. 2 is a composite plot of the airfoils as are described herein.

FIG. 2 shows a family of airfoils 140. The airfoils 140 are designed for the inboard region 110 of the blade 100. In this example, four (4) airfoils 140 are shown, a first airfoil 150, a second airfoil 160, a third airfoil 170, and a fourth airfoil 180. An infinite number of the airfoils 140 may be used. A chord line 190 extends from, a leading edge 200 to a trailing edge 210 of each of the airfoils 140. In this example, the chord line 190 extends through the middle of the airfoils 140.

In this example, the trailing edges 210 are blunt or have a "flat back". The leading edges 200 are curved. Each airfoil 140 also includes a suction side 220 and a pressure side 230. Each suction side 220 has a substantially oval shape while each pressure side 230 has a substantially S-shape. The suction sides 220 and the pressure sides 230 do not intersect the chord line 190. Each of the airfoils 140 is connected by a smooth curve.

The specific shape of the airfoil 150 is given in Table 1 in the form of dimensionless coordinates. The X/C values represent locations on the chord line 190 in relation to the trailing edge 210. The Y/C values represent heights from the chord line 190 to points on either the suction side 220 or the pressure side 230. The values are scalable as a function of the same constant or number to provide a scaled up or scaled down airfoil.

TABLE 1

| x/c | y/c |
|---|---|
| 1.00000000 | 0.03726164 |
| 0.90036720 | 0.06785235 |
| 0.80067860 | 0.08990651 |
| 0.70007530 | 0.10734770 |
| 0.60106600 | 0.12091980 |
| 0.50066880 | 0.13214710 |
| 0.40005820 | 0.14126440 |
| 0.30031070 | 0.14733190 |
| 0.20042560 | 0.14654610 |
| 0.10049920 | 0.12712570 |
| 0.00000000 | 0.00000000 |
| 0.10065920 | −0.12659800 |
| 0.20022940 | −0.14866100 |
| 0.30009620 | −0.15000300 |
| 0.40096110 | −0.13401000 |
| 0.50042920 | −0.10618000 |
| 0.60041830 | −0.07248480 |
| 0.70074310 | −0.03982390 |
| 0.80018960 | −0.01648170 |
| 0.90094460 | −0.01118480 |
| 1.00000000 | −0.03773510 |

As is shown at the X=1 location, the trailing edge 210 of the airfoil 150 has a given width. That width narrows towards the X=0.9 position, continues to narrow and then expands until past the X=0.3 position. The shape again narrows towards the leading edge 200 in a largely oval shape and then returns towards the trailing edge 210.

The second airfoil 160 is similar but somewhat thicker. As above, the second airfoil 160 also has the narrowing dip between the position X=1 and the position X=0.8. The shape of the second airfoil 160 is defined as follows:

TABLE 2

| x/c | y/c |
|---|---|
| 1.00000000 | 0.07476157 |
| 0.90046010 | 0.10220790 |
| 0.80029790 | 0.12248030 |
| 0.70049780 | 0.13862410 |
| 0.60022080 | 0.15149490 |
| 0.50073840 | 0.16167160 |
| 0.40103380 | 0.16936190 |
| 0.30001950 | 0.17332270 |
| 0.20017300 | 0.16904810 |
| 0.10033560 | 0.14399980 |
| 0.00000000 | 0.00000000 |
| 0.10085420 | −0.14364800 |
| 0.20034960 | −0.17120100 |
| 0.30024750 | −0.17597900 |
| 0.40050510 | −0.16227900 |
| 0.50051480 | −0.13568000 |
| 0.60100430 | −0.10275700 |
| 0.70074630 | −0.07116550 |
| 0.80063010 | −0.04891650 |
| 0.90051680 | −0.04553450 |
| 1.00000000 | −0.07523460 |

The shape of the third airfoil 170 is similar to those described above, but again thicker. The third airfoil 170 also has the dip between the position X=1 and the position X=0.8. The shape of the third airfoil 170 is defined as follows:

TABLE 3

| x/c | y/c |
|---|---|
| 1.00000000 | 0.11226081 |
| 0.90063769 | 0.13652491 |
| 0.80109208 | 0.15473962 |

TABLE 3-continued

| x/c | y/c |
|---|---|
| 0.70100077 | 0.16967702 |
| 0.60050336 | 0.18158922 |
| 0.50083265 | 0.19073012 |
| 0.40094014 | 0.19697082 |
| 0.30087793 | 0.19867672 |
| 0.20005762 | 0.19089852 |
| 0.10048941 | 0.16042992 |
| 0.00000000 | 0.00000000 |
| 0.10034881 | −0.15978302 |
| 0.20060802 | −0.19312702 |
| 0.30043493 | −0.20132002 |
| 0.40002894 | −0.18996502 |
| 0.50060705 | −0.16471402 |
| 0.60057116 | −0.13303101 |
| 0.70081557 | −0.10227001 |
| 0.80004708 | −0.08139181 |
| 0.90013649 | −0.07984641 |
| 0.90125599 | −0.07998141 |
| 1.00000000 | −0.11273501 |

The shape of the fourth airfoil 180 is similar to that as described above, but again thicker. The fourth airfoil 180 has the dip between the position X=1 and the position X=0.8. The shape of the fourth airfoil 180 is defined as follows:

TABLE 4

| x/c | y/c |
|---|---|
| 1.00000000 | 0.13726020 |
| 0.90000000 | 0.15989241 |
| 0.80000000 | 0.17787950 |
| 0.70000000 | 0.19334258 |
| 0.60000000 | 0.20609266 |
| 0.50000000 | 0.21607175 |
| 0.40000000 | 0.22261591 |
| 0.30000000 | 0.22363103 |
| 0.20000000 | 0.21369481 |
| 0.10000000 | 0.17827485 |
| 0.00000000 | 0.00002100 |
| 0.10000000 | −0.17758316 |
| 0.20000000 | −0.21583323 |
| 0.30000000 | −0.22630101 |
| 0.40000000 | −0.21557439 |
| 0.50000000 | −0.19017060 |
| 0.60000000 | −0.15766700 |
| 0.70000000 | −0.12602585 |
| 0.80000000 | −0.10435340 |
| 0.90000000 | −0.10306262 |
| 1.00000000 | −0.13773604 |

By incorporating a relatively thick trailing edge 210, the extent of the pressure recovery on the airfoil suction surface is alleviated. Such permits the flow to remain attached so as to provide substantial lift performance. Specifically, lift coefficients greater than 3.0 have been measured. The airfoils 140 thus provide improved aerodynamic performance and efficiency with improved structural stiffness (bending moment of inertia). These improvements lead to increased energy capture and reduced blade weight. Indirectly, the airfoils 140 also minimize the aerodynamic compromise due to transportation constraints (max chord). The dip between the 1.0 and the 0.8 positions also reduces the overall weight as compared to known blunt trailing edge designs.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. A plurality of airfoils for a wind turbine blade, the wind turbine comprising a wind turbine hub, each airfoil comprising:
   a leading edge;
   a blunt trailing edge;
   a chord line extending from the leading edge to the blunt trailing edge;
   a substantially oval shaped suction side; and
   a substantially S-shaped pressure side,
   wherein the plurality of airfoils decrease in cross-sectional area along the turbine blade in a direction extending away from the wind turbine hub,
   wherein the substantially oval shaped suction sides comprise non-dimensional coordinate values of x/c and positive y/c set forth in Tables 1-4, the x/c values representing locations on the chord line in relation to the trailing edges and the positive y/c values representing heights from the chord line to points on the suction sides.

2. The plurality of airfoils of claim 1, wherein the substantially oval shaped suction sides and the substantially S-shaped pressure sides do not intersect the chord line.

3. The plurality of airfoils of claim 1, wherein the substantially S-shaped pressure sides comprise non-dimensional coordinate values of x/c and negative y/c set forth in Tables 1-4, the x/c values representing locations on the chord line in relation to the trailing edges and the negative y/c values representing heights from the chord line to points on the pressure sides.

4. The plurality of airfoils of claim 1, wherein each of the plurality of airfoils is connected by a smooth curve.

5. The plurality of airfoils of claim 1, wherein each of the plurality of airfoils comprises a curved leading edge.

6. The plurality of airfoils of claim 1, wherein a first of the plurality airfoils comprises a profile substantially in accordance with non-dimensional coordinate values of x/c and y/c set forth in Table 1, the x/c values representing locations on the chord line in relation to the trailing edge and the y/c values representing heights from the chord line to points on the suction and pressure sides.

7. The plurality of airfoils of claim 1, wherein a second of the plurality airfoils comprises a profile substantially in accordance with non-dimensional coordinate values of x/c and y/c set forth in Table 2, the x/c values representing locations on the chord line in relation to the trailing edge and the y/c values representing heights from the chord line to points on the suction and pressure sides.

8. The plurality of airfoils of claim 1, wherein a third of the plurality airfoils comprises a profile substantially in accordance with non-dimensional coordinate values of x/c and y/c set forth in Table 3, the x/c values representing locations on the chord line in relation to the trailing edge and the positive y/c values representing heights from the chord line to points on the suction and pressure sides.

9. The plurality of airfoils of claim 1, wherein a fourth of the plurality airfoils comprises a profile substantially in accordance with non-dimensional coordinate values of x/c and y/c set forth in Table 4, the x/c values representing locations on the chord line in relation to the trailing edge and the y/c values representing heights from the chord line to points on the suction and pressure sides.

10. A turbine blade having a plurality of airfoils, comprising:
    a first airfoil;
    the first airfoil comprising a profile substantially in accordance with non-dimensional coordinate values of x/c and y/c set forth in Table 1;
    a second airfoil;
    the second airfoil comprising a profile substantially in accordance with non-dimensional coordinate values of x/c and y/c set forth in Table 2;
    a third airfoil;
    the third airfoil comprising a profile substantially in accordance with non-dimensional coordinate values of x/c and y/c set forth in Table 3; and
    a fourth airfoil;
    the fourth airfoil comprising a profile substantially in accordance with non-dimensional coordinate values of x/c and y/c set forth in Table 4,
    each airfoil comprising a chord line extending from a leading edge to a blunt trailing edge of the airfoil, the values of x/c representing locations on the chord line in relation to the trailing edge and the values of y/c representing heights from the chord line to points on the suction and pressure sides.

11. The turbine blade of claim 10, wherein the values of x/c and y/c are scalable as a function of the same constant or number to provide a scaled up or scaled down airfoil.

12. The turbine blade of claim 10, wherein the plurality of airfoils are connected by a smooth curve.

13. A plurality of airfoils for a wind turbine blade, the wind turbine comprising a wind turbine hub, each airfoil comprising:
    a leading edge;
    a blunt trailing edge;
    a chord line extending from the leading edge to the blunt trailing edge;
    a substantially oval shaped suction side; and
    a substantially S-shaped pressure side,
    wherein the plurality of airfoils decrease in cross-sectional area along the turbine blade in a direction extending away from the wind turbine hub;
    wherein the substantially S-shaped pressure sides comprise non-dimensional coordinate values of x/c and negative y/c set forth in Tables 1-4, the x/c values representing locations on the chord line in relation to the trailing edges and the negative y/c values representing heights from the chord line to points on the pressure sides.

14. The plurality of airfoils of claim 13, wherein the substantially oval shaped suction sides and the substantially S-shaped pressure sides do not intersect the chord line.

15. The plurality of airfoils of claim 13, wherein each of the plurality of airfoils is connected by a smooth curve.

16. The plurality of airfoils of claim 13, wherein each of the plurality of airfoils comprises a curved leading edge.

17. The plurality of airfoils of claim 13, wherein a first of the plurality airfoils comprises a profile substantially in accordance with non-dimensional coordinate values of x/c and y/c set forth in Table 1, the x/c values representing locations on the chord line in relation to the trailing edge and the y/c values representing heights from the chord line to points on the suction and pressure sides.

18. The plurality of airfoils of claim 13, wherein a second of the plurality airfoils comprises a profile substantially in accordance with non-dimensional coordinate values of x/c and y/c set forth in Table 2, the x/c values representing locations on the chord line in relation to the trailing edge and the y/c values representing heights from the chord line to points on the suction and pressure sides.

19. The plurality of airfoils of claim 13, wherein a third of the plurality airfoils comprises a profile substantially in accordance with non-dimensional coordinate values of x/c and y/c set forth in Table 3, the x/c values representing locations on the chord line in relation to the trailing edge and the positive y/c values representing heights from the chord line to points on the suction and pressure sides.

20. The plurality of airfoils of claim 13, wherein a fourth of the plurality airfoils comprises a profile substantially in accordance with non-dimensional coordinate values of x/c and y/c set forth in Table 4, the x/c values representing locations on the chord line in relation to the trailing edge and the y/c values representing heights from the chord line to points on the suction and pressure sides.

* * * * *